United States Patent [19]

Makino et al.

[11] Patent Number: 5,301,078
[45] Date of Patent: Apr. 5, 1994

[54] MAGNETIC DISK UNIT AND MANUFACTURING METHOD OF CARRIAGE STRUCTURE THEREOF

[75] Inventors: Toshiaki Makino; Marutomo Goto, both of Ibaraki; Hideyuki Kimura; Takashi Yamaguchi, both of Tsuchiura; Hiromu Hirai, Tsukuba; Takashi Kono, Ibaraki; Ryoji Okada, Ibaraki; Toshihiro Yamada, Ibaraki; Yasuhiro Yoshimura, Ibaraki; Hideaki Amano, Odawara; Akio Takatsuka, Hiratsuka; Toshio Matsushita; Satoru Yamaura, both of Odawara; Yuichi Koizumi, Hiratsuka, all of Japan

[73] Assignee: Hitachi, Ltd., Tokyo, Japan

[21] Appl. No.: 713,994

[22] Filed: Jun. 12, 1991

[30] Foreign Application Priority Data

Jun. 15, 1990 [JP] Japan .................. 2-155138
Sep. 25, 1990 [JP] Japan .................. 2-254712
Nov. 2, 1990 [JP] Japan .................. 2-295342

[51] Int. Cl.$^5$ ............................ G11B 21/16
[52] U.S. Cl. ........................................ 360/106
[58] Field of Search .......................... 360/106

[56] References Cited

U.S. PATENT DOCUMENTS

| | | | |
|---|---|---|---|
| 4,796,122 | 1/1989 | Levy et al. | 360/106 |
| 4,860,135 | 8/1989 | Cain | 360/106 |
| 5,140,482 | 8/1992 | Kimura et al. | 360/97.02 |

FOREIGN PATENT DOCUMENTS

| | | |
|---|---|---|
| 428289 | 5/1991 | European Pat. Off. ........... 360/106 |
| 188878 | 8/1988 | Japan . |
| 1-2264 | 1/1989 | Japan . |
| 1-92065 | 8/1989 | Japan . |
| 1-40669 | 9/1989 | Japan . |
| 1-40670 | 9/1989 | Japan . |

*Primary Examiner*—Carolyn E. Fields
*Attorney, Agent, or Firm*—Antonelli, Terry, Stout & Kraus

[57] ABSTRACT

A magnetic disk unit comprising a one-piece carriage structure having a small thermal off-tracking amount, with the carriage structure including a rotary shaft; guide arms integrally supported on a guide-arm retainer at their proximal ends and extending independently and parallely; bearing retainers formed on both ends of the guide-arm retainer; and bearings fixed on the bearing retainers rotatably connecting the guide-arm retainer to the rotary shaft. A center line in a direction of thickness of the outermost guide arm is located outside of that of the bearing in a direction of height thereof, and a concave portion is continuously formed on the bearing retainer. Thermal coefficients of expansion of the guide arms and the guide-arm retainer are substantially equal, with the carriage structure being fashioned of an alloy mainly containing Al and Si, eutectic crystal Si particles in the guide arm and/or the guide-arm retainer. The average value of the longest eutectic crystal Si particles therein is 1.6 µm or less or the number of the eutectic crystal Si particles if 5.0 or more per 100 µm$^2$. In the carriage of manufacturing the carriage of the carriage structure is heated for five to fifteen hours at a temperature of 300° to 500° C. after die casting.

20 Claims, 12 Drawing Sheets

MAGNETIC DISK UNIT AND MANUFACTURING METHOD OF CARRIAGE STRUCTURE THEREOF

BACKGROUND OF THE INVENTION

The present invention relates to a magnetic disk unit and a manufacturing method of a carriage thereof and, more particularly, to a method of manufacturing a low thermal deformation carriage structure having minimal thermal off-tracking and a high reliability, and to a magnetic disk unit utilizing the carriage structure.

As disclosed in Japanese Patent Unexamined Publication No. 63-188878, a conventional apparatus comprises actuator arms and the like which are integrally formed, with support arms and the like to which a plurality of magnetic heads (hereinafter, heads) are secured by screw-fasteners or adhesive material being attached to the distal ends thereof. Thus, thermal deformation of the joint portions due to a change of temperature can be reduced so as to prevent a positioning error of the heads.

Further, this one-piece carriage is provided with a coil for a voice coil motor which actuates the carriage.

An apparatus of the aforementioned is disclosed in, for U.S. Pat. No. 4,796,122, and Japanese Utility Model Unexamined Publication Nos. 64-12264, 1-140669, 1-140670.

Next, in relation to a structure of an Al-Si alloy as a material of the one-piece carriage, a method of making eutectic-crystal Si particles finer by heating and processing to thereby improve cutting capability of a work piece is disclosed in Japanese Patent Unexamined Publication No. 50-57906.

In the conventional technique described above, the one-piece carriage is used to solve the vibration problem of a plurality of support arms for supporting the heads. Particularly, in order to reduce thermal deformation due to bonding of dissimilar metals caused between the support arms and the one-piece carriage in response to a change of temperature, the one-piece carriage is made of an alloy material (e.g., an Al-Si alloy) such that the coefficient of thermal expansion of the carriage is substantially equal to that of the support arms. Additionally, a die casting method, excellent in productivity, is employed as a method of forming the one-piece carriage.

In the conventional technique, the one-piece carriage is arranged in such a manner that guide arms whose proximal ends are integrally held by a common guide-arm retaining portion are juxtaposed to be separate from one another in the axial direction of the guide-arm retaining portion. However, sufficient consideration is not given to prevention of thermal deformation force, which is generated between bearings attached to a rotary shaft and bearing retainers of the carriage due to the temperature change, from being transmitted to the outermost guide arm. Namely, a structure for minimizing the deformation is not taken into account. The conventional technique involves a problem in further decreasing an amount of thermal off-tracking of the magnetic disk unit of a dedicated servo system. The amount of thermal off-tracking in this case is a difference between amounts of thermal deformation at the distal end of a head of a guide arm for data and at the distal end of a head of a servo guide arm due to temperature increases and decreases, which will be described more fully hereinbelow.

Moreover, in the conventional technique, a coil portion and the one-piece carriage are directly combined. Usually, the coil portion and the one-piece carriage are made of metals having different coefficients of thermal expansion. When an electric current flows to the coil portion, heat is generated in it so as to induce non-uniform thermal deformation between the metals of these members. As a result, an error in a relative positional relationship results between the heads provided at the distal ends of the support arms and magnetic disks, thereby resulting in of thermal off-tracking.

In the one-piece carriage, however, a guide arm portion, a side of the guide-arm retaining portion which is opposite to the side which faces the guide arm portion (hereinafter guide-arm back portion), the portions where a flexible printed circuitboard is attached (hereinafter FPC holders) having different thickness so that there is a difference in cooling speeds at the time of die casting production. Moreover, the structures and compositions (sizes of primary crystals and eutectic crystals of Si and amounts of Si) are different, and the constants of the materials such as, for example, thermal expansion coefficients and the like being different. Therefore, thermal expansion of each portion in the one-piece carriage is non-uniform, and amounts of thermal expansion of the respective portions differ, resulting in a positioning accuracy problem of the heads when the dedicated servo system is employed.

SUMMARY OF THE INVENTION

An object of the present invention is to provide a magnetic disk unit including a carriage structure by which thermal deformation force, which is generated between at least one of the outermost bearings engaged with a rotary shaft and a bearing retainer of an one-piece carriage tight-fitted to the bearing, can be prevented from being transmitted to the outermost guide arm, so as to reduce an amount of thermal off-tracking at the distal end of a head, thus improving positioning accuracy when there is a change of temperature.

Another object of the invention is to provide a magnetic disk unit including a carriage structure which can prevent a relative positioning error of magnetic heads induced by thermal deformation of guide arms.

A still further object of the invention is to provide an one-piece carriage which solves the vibration problem and has substantially the same coefficient of thermal expansion as that of support arms.

A further object of the invention is to provide a highly reliable carriage formed of an Al-Si alloy by a die casting method which is excellent in productivity, with a material structure thereof being controlled, to thereby reduce an amount of thermal deformation of the carriage.

A technique disclosed in Japanese Patent Unexamined Publication No. 50-57906 is intended to improve the cutting capability of a work piece, but no consideration is given to such factors as equalization of thermal expansion coefficients and reduction of thermal deformation.

To achieve the above-described objects, the present invention provides a magnetic disk unit comprising a carriage structure including a rotary shaft, with a plurality of guide arms being integrally supported on an arm-retaining portion at their proximal ends and extending independently from one another in parallel relationship in an axial direction of the arm-retaining portion. Bearing retainers are formed on both ends of the guide-arm retaining portion, with bearings being fixed on the bearing retainers so as to rotatably connect the guide-arm retaining portion to the rotary shaft. The carriage structure of the magnetic disk unit is arranged in such a manner that at least one of the outermost guide arms has a center line in a direction of thickness thereof, with the center line being located outside of a center line of the bearing in a direction of height thereof. The bearing is provided on the side corresponding to the guide arm, and the carriage structure includes a concave portion which is continuously formed on the outer peripheral portion of the bearing retainer, extending inwardly from the outside surface of the bearing retainer. Alternatively, the outermost guide arm and the concave portion of the bearing retainer are formed separately from the other guide arms and the guide-arm retaining portion, and the above both portions may be integrally fixed to each other by a tightening member.

Further, the invention provides a magnetic disk unit comprising a carriage structure including a rotary shaft, with a plurality of guide arms being integrally supported on a guide-arm retaining portion at their proximal ends and extending independently from one another in a parallel relationship in an axial direction of the guide-arm retaining portion. Bearing retainers are formed on both ends of the guide-arm retaining portion, with bearings being fixed on the bearing retainers so as to rotatably connect the guide-arm retaining portion to the rotary shaft. The carriage structure is arranged in such a manner that at least one of the outermost guide arms has a center line in a direction of thickness thereof, with the center line being located outside of a center line of the bearing in a direction of height thereof. The bearing is provided on the side corresponding to the guide arm, and the carriage structure also includes buffer means made of a material different from the bearing and the bearing retainer therebetween. The buffer means is provided with a continuous recess portion extending from the outer surface of the buffer means toward the inside thereof.

Moreover, according to the invention, there is also provided a magnetic disk unit comprising a carriage structure including a rotary shaft, with a plurality of guide arms which being integrally supported on a guide-arm retaining portion at their proximal ends and extending independently from one another in a parallel relationship in an axial direction of the guide-arm retaining portion. Bearing retainers are formed on both ends of the guide-arm retaining portion, with bearings being fixed on the bearing retainers so as to rotatably connect the guide-arm retaining portion to the rotary shaft. The carriage structure is arranged in such a manner that at least one of the outermost guide arms has a center line in a direction of thickness thereof, with the center line being located outside of a center line of the bearing in a direction of height thereof. The bearing is provided on the side corresponding to the guide arm, and the carriage structure includes a notched portion formed on the outer corner of the contacting portion of the bearing with the bearing retainer so as to define a concave portion.

In any one of the above carriage structures, it is preferably that the lowermost guide arm includes a center line in a direction of thickness thereof located higher than a center line of the bearing in a direction of height thereof. The concave portion may be at least one circumferential groove. Alternatively, the concave portion may be deformation stress damping holes for preventing the thermal deformation stress caused by a different between the thermal expansion coefficients of the bearing and the bearing retainer being transmitted to the outermost guide arm.

It is preferable that the thermal expansion coefficient $\alpha_0$ of a material for the bearings is predetermined to be smaller than the thermal expansion coefficient $\alpha_1$ of a material for the bearing retainers ($\alpha_0 < \alpha_1$). When the thermal expansion coefficients of the material for the bearings, the bearing retainers and the buffer means are represented by $\alpha_0$, $\alpha_1$, $\alpha_2$, and elastic modulus thereof are represented by $E_0$, $E_1$, $E_2$, are predetermined to satisfy following functional relationships:

$$\alpha_0 < \alpha_2 < \alpha_1 \text{ and } E_0 > E_2 > E_1.$$

In any one of the carriage structures, it is favorable that the bearing, the bearing retainer and the buffer means are integrally tight-fitted with one another. The concave portion is preferably formed in such a manner that the depth thereof substantially corresponds to the center line in the direction of height of the bearing. Alternatively, the concave portion may be formed so as to extend from the upper surface of the guide arm by a length of 2.0-6.0 mm.

With the above-mentioned carriage structure, the magnetic disk unit according to the invention operates in such a manner as to be described below.

Because the concave portion is provided in the vicinity of the outermost guide arm and the center line of the outermost guide arm in the direction of thickness thereof is located outside of the center line of the corresponding bearing in the direction of height thereof, a thermal deformation stress, caused by a difference between the thermal expansion coefficients of the materials for the bearing and the bearing retainer, is absorbed by the concave portion so that the thermal deformation stress is not transmitted to the outermost guide arm. Therefore, in the magnetic disk unit according to the invention, an accuracy of positioning heads can be enhanced because the magnetic disk unit is not influenced by the thermal deformation stress.

A circumferential groove or a plurality of holes are allowable as a concrete configuration of the concave portion, but shapes different from those are applicable if the different shaped are capable of damping the deformation stress for preventing transmission of the thermal deformation due to a change of temperature to the guide arms.

More particularly, when the concave portion is formed in such a manner that the depth thereof substantially corresponds to the center line of the bearing in the direction of height thereof, the thermal deformation stress between the bearing retainer and the bearing due to the change of temperature, and especially a concentrated thermal deformation stress acting on the central portion of the bearing in the direction of height thereof can be sufficiently prevented from being transmitted to the outermost guide arm. Thus, a thermal off-tracking amount generated between the guide arm for servo signals and the guide arm for data signals can be reduced.

Therefore, in the magnetic disk unit of the invention, it is possible to improve the accuracy of positioning the heads, irrespective of the change of the temperature.

Further, in order to attain the above-described objects, a one-piece carriage is constituted in such a manner that a concave portion (cut-off portion) is provided on at least one or more portions in the vicinity of a section which supports a coil, thereby restricting a thermal stress generated at the coil from being transmitted to the vicinity of a bearing retainer of the one-piece carriage.

With such construction of the one-piece carriage, thermal stresses are produced at various parts of the coil due to the heat generated when an electric current flows through the coil secured to the one-piece carriage. The thermal stresses do not uniformly distribute at the various parts so that they are not transmitted to a coil holder of the one-piece carriage uniformly.

However, since the concave portion is provided between the bearing retainer and the coil holder of the one-piece carriage, the thermal stresses are transmitted in the remainder of the bearing retainer except the concave portion so that the guide arms of the one-piece carriage are not influenced by the thermal stresses.

The thermal deformation of the one-piece carriage is caused because material characteristics, more particularly, thermal expansion coefficients of the respective component parts of the carriage are uneven. A difference between the thermal expansion coefficients results from a difference of structure and composition between the materials which is caused by a difference of cooling speeds during manufacturing the carriage by die casting. Accordingly, to achieve the objects of the invention, it is necessary to control the structure and composition of the material for each of the component parts of the one-piece carriage, and more particularly, the guide arm and the guide-arm retaining portion which suffer from the thermal deformation, against a back portion of the guide-arm retaining portion opposite to the guide arms and FPC holders so as to equilibrium the thermal expansion coefficients of the guide arm and the guide-arm retaining portion.

The one-piece carriage according to the invention is constituted integrally with one or more guide arms which are rotatably supported by a rotary shaft and which are mounted at one end thereof perpendicularly to an axial direction of an actuator swingingly moved by drive means, a guide-arm retaining portion for supporting the guide arms in alignment and with certain intervals, and bearing retainers for holding bearings to be connected. Further, the carriage includes either of the following features.

The thermal expansion coefficients of the guide arm and the guide-arm retaining portion are substantially equal to each other.

The thermal expansion coefficients of the guide arm, a thick portion of the guide-arm retaining portion which is opposite to the guide arm, and thick flexible printed circuitboard holders for attaching a printed circuitboard to the guide-arm retaining portion, are at least substantially equal to one another.

The one-piece carriage is made of an alloy whose main components are Al and Si, and eutectic crystal Si particles in a microscopical structure of the guide arm and/or the guide-arm retaining portion are finely divided.

The carriage is made of an alloy whose main components are Al and Si, the average value of the longest eutectic crystal Si particles in the microscopical structure of the guide arm, the guide-arm retaining portion and/or the bearing retainer, is 1.6 $\mu$m or less.

The carriage is made of an alloy whose main components are Al and Si, and the number of the eutectic crystal Si particles in the microscopical structure of the guide arm, the guide-arm retaining portion and/or the bearing retainer, is not less than 5.0 per 100 $\mu m^2$.

The entire carriage is formed into an integral product by die casting.

The entire carriage is formed into an integrally-molded product made of an alloy whose main components are Al and Si.

The alloy contains Si by 8-20 weight %.

The carriage is manufactured of the alloy mainly containing Al and Si, and it is heated for an interval of 5 to 15 hours at a temperature of 300° C. to 500° C., preferably for 5 to 15 hours at a temperature of 350° C. to 450° C., after it is formed by die casting.

Advantageous characteristics obtained by the invention which utilizes the following structures, will be specified.

In a dedicated servo system a single disk is selected as a disk for positioning data from a plurality of magnetic disks, with a single head being used for positioning. Because it is unnecessary to write positioning data in the remaining disks, this system is advantageous in that a magnetic capacity is increased and an operation of writing the positioning data is simplified. On the contrary, since the head remote from the positioning head largely fails to be positioned with respect to the positioning head due to thermal deformation, the thermal deformation must be restrained strictly.

The terms listed below, as used in this specification, may be defined as follows.

The guide arms are portions extending from the carriage perpendicularly to an axial direction of an actuator for retaining support arms with the magnetic heads in alignment and with certain intervals.

The guide-arm retaining portion is a cylindrical portion in the carriage, for supporting the guide arms at their one ends.

In the guide-arm retaining portion, the back portion opposite to the guide arm is a thick portion which is located opposite to the guide arms.

The bearing retainers are cylindrical end portions of the guide-arm retaining portion for supporting the bearing.

The FPC holders are provided at the upper and lower end portions of the cylinder in the guide-arm retaining portion, and thick portions to which FPC for mainly amplifying electrical signals from the heads is attached.

Since the carriage is a component part for supporting the heads, the thermal deformation thereof which results in an error in positioning the heads must be minimized and it must be rigid enough to reduce vibration. In order to shorten a time for displacing the head from one magnetic recording position to another magnetic recording position on the disk (access time), a reduction of moment of the carriage, that is, a decrease in the weight of the carriage is required.

Under such condition, an Al alloy which is a lightweight alloy is used for the carriage at present, and a content rate of Si becomes higher for increasing the rigidity of the carriage (generally, 8-20%). When 19 wt % of Si is added to the Al alloy, the thermal expansion coefficient of the alloy is substantially equal to that of stainless steel forming support arms theoretically so that thermal deformation at the contacting surfaces between the support arms and the carriage is reduced.

The invention can be well understood when reading the following supplementary explanation.

Thermal expansion coefficients mentioned in the description of embodiments of the present invention are values which were all measured by a laser thermal expansion measuring instrument LIX-1M/L produced by Shinku Rikou K.K. The measurement was conducted within a range of temperature of 0° to 100° C. Average coefficients of thermal expansion within a range of temperature of 0° to 55° C. were used as the thermal expansion coefficients.

When an Al-Si alloy in molten state is cooled down, Si particles deposit first. These particles have angular shapes and are called primary-crystal Si particles. Next, Si particles and Al base phase deposit together. These particles have elongated shapes and are called eutectic-crystal Si particles which are generally of a laminated structure with the Al base phase.

The thermal expansion coefficient of Si is about $2.6 \times 10^{-6}/°C$., which is by far less than that of Al of about $23.1 \times 10^{-6}/°C$. Consequently, the thermal expansion coefficient of the entire alloy varies according to the state of distribution of Si. Particularly, the shape and distribution state of the eutectic-crystal Si particles which are continuously distributed all over the structure give greater influence to the thermal expansion coefficient than those of the primary-crystal Si particles which are isolated.

Therefore, in order to reduce the influence of the eutectic-crystal Si particles toward the thermal expansion coefficient, the eutectic-crystal Si particles need to be divided into finer particles to be isolated and dispersed. A result of investigations of various kinds shows that the most suitable structure includes, per 100 $\mu m^2$, about five or more eutectic-crystal Si particles after the dividing process. If the number of the eutectic-crystal Si particles is less than that, the particles have elongated shapes so that the influence of the eutectic-crystal Si particles toward the thermal expansion coefficient is relatively large.

As described above, when the elongated eutectic-crystal Si particles are divided into spherical particles to be isolated and dispersed in the structure, dispersion of thermal expansion coefficients due to a difference in cooling speeds at the time of die casting production can be reduced. In this case, roughly divided Si particles are not favorable with respect either strength and brittleness. Consequently, finely divided Si particles are preferably in every respect.

Since the state of divided eutectic-crystal Si particles greatly influences the thermal expansion coefficient, a method of quantitatively evaluating the configurations of eutectic-crystal Si particles before and after the dividing process is necessary. In the present invention, the structure of the carriage was first observed by a scanning-type electron microscope (SEM), and observation photographs thereof were subjected to picture processing so as to evaluate the structure.

A length of each particle in a direction of longest length is referred to as a particle longest length, and an average value of such lengths of the particles within a field of view in the measurement is referred to as an average value of the particle longest lengths.

With the above-described structure, the magnetic disk unit according to the present invention operates in the following manner.

First, the temperature of the carriage is increased by heat of the actuator and the like during the operation of the unit. The carriage expands due to this temperature increase. Unless there is a relative positioning error of each of the heads with respect to the servo head which controls the positions of the heads, there will be no error in the head position on the magnetic disk surface. However, if thermal expansion coefficients of the respective portions of the carriage are not uniform, amounts of thermal expansion of the portions will be different to distort the carriage so that the heads will be irregularly deformed with respect to the servo head. Therefore, the heads will be displaced from the head positions determined by the servo head, resulting in the unit being incapable of reading and writing operations.

On the other hand, when each of the portions of the carriage has a uniform thermal expansion coefficient, there is no relative positioning error of the head with respect to the servo head because the portions of the carriage expand uniformly even if the temperature of the carriage is increased during the operation of the unit.

In the one-piece carriage made of an Al-Si alloy by the die casting method, distributions of primary crystals and eutectic crystals of Si of the respective portions are different due to a difference of cooling speeds at the time of the production. The thermal expansion coefficient of Si is about $2.6 \times 10^{-6}/°C$., which is by far less than that of Al of about $23.1 \times 10^{-6}/°C$. Consequently, the thermal expansion coefficient of the entire alloy varies according to a state of the distribution of Si. In other words, if the primary-crystal Si phase is small, and if the eutectic-crystal Si layers are finely and continuously extended, Si will be so influential that the thermal expansion coefficient of the entire alloy will be smaller.

Therefore, when the continuously extended eutectic-crystal Si layers are divided and dispersed in the form of fine particles, an average value of thermal expansion coefficients in proportion with a volume percentage of Si and can be obtained.

If the cooling speed is high, the primary-crystal Si phase will be small, and the eutectic-crystal Si layers will be finely and continuously extended, with the result being that the thermal expansion coefficient will be smaller. After the die casting production, therefore, the eutectic-crystal Si layers are divided by reheating or the like method and dispersed in the form of fine particles, so that there will be no difference in thermal expansion coefficients owing to the difference in cooling speeds at the time of die casting production.

DETAILED DESCRIPTION OF THE PREFERRED EMBODIMENTS

Figure 1:
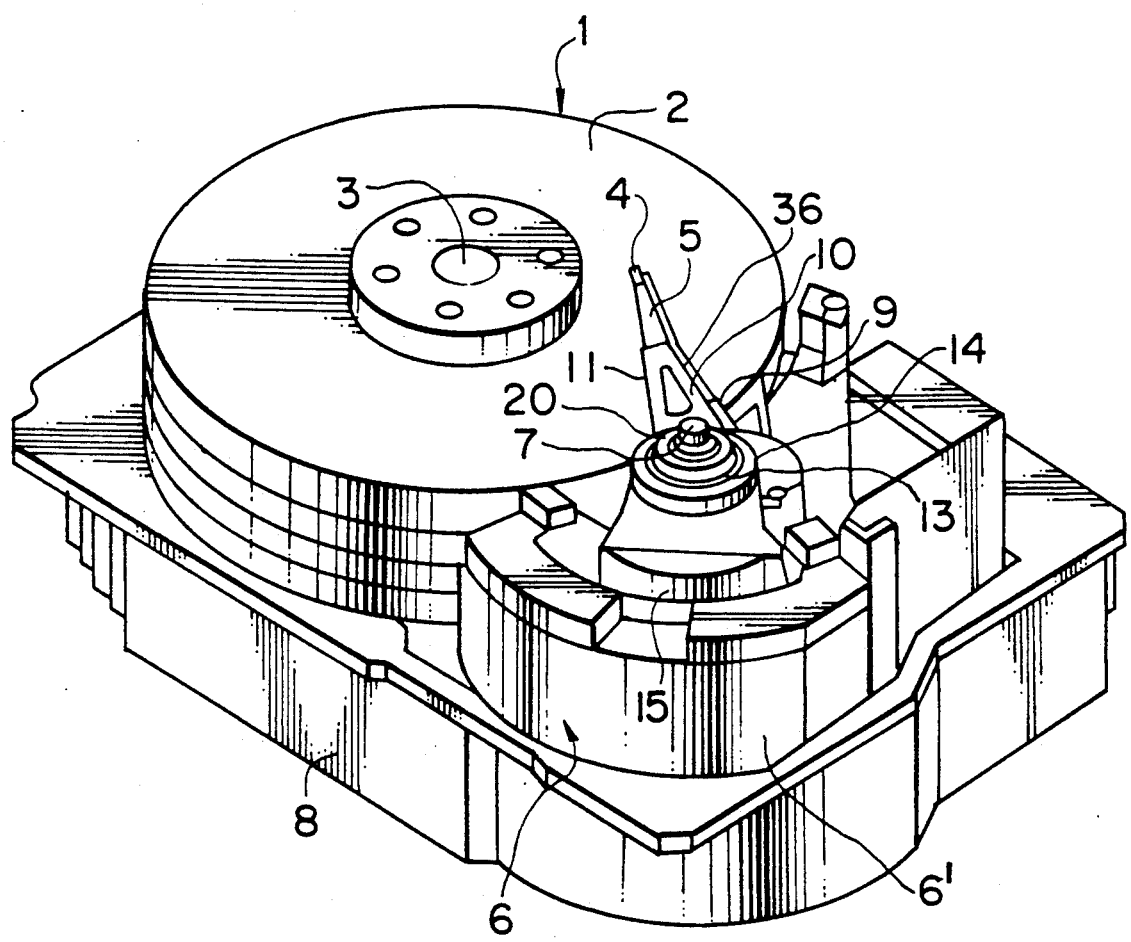
FIG. 1 is a perspective view of a magnetic disk unit, showing a first embodiment of the present invention.

In FIG. 1, a magnetic disk unit 1 is mounted on a base 8, with the disk unit 1 comprising a plurality of overlying disks 2 vertically located at equal intervals, and with a spindle shaft 3, driven by a spindle motor (not shown) and disposed at a lower portion of the spindle shaft 3, rotating the disks 2. Heads 4 are provided to read and-/or write magnetic data on the disks 2, with support arms 5 for supporting the heads 4 vertically as well as in an access direction of the data. A one-piece carriage 10 includes guide arms 11, with an actuator rotatively driving the guide arms 11 and support arm 5 around the carriage axle 7.

Figure 2:
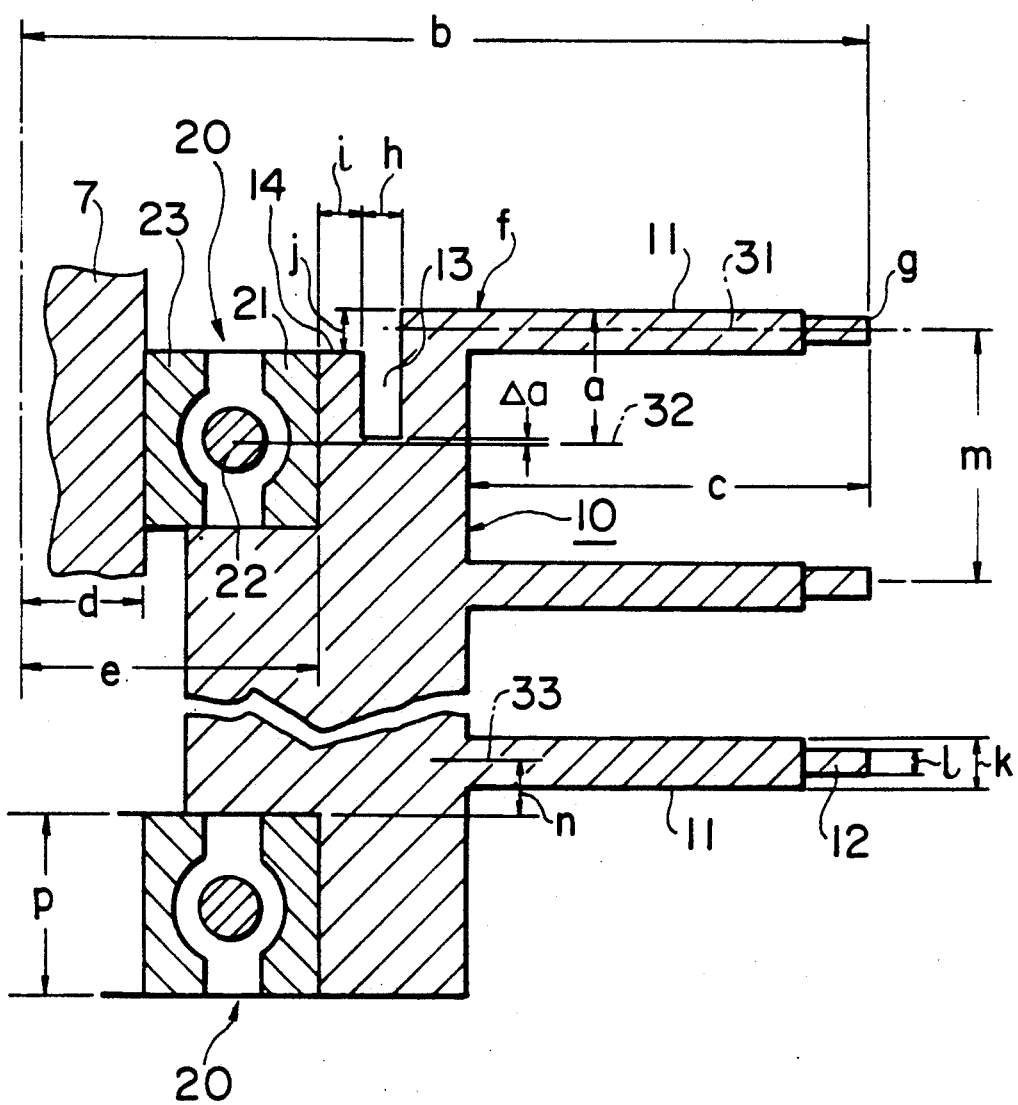
FIG. 2 is a cross-sectional view of an upper structure of a one-piece carriage in the first embodiment of the invention.
Figure 3:
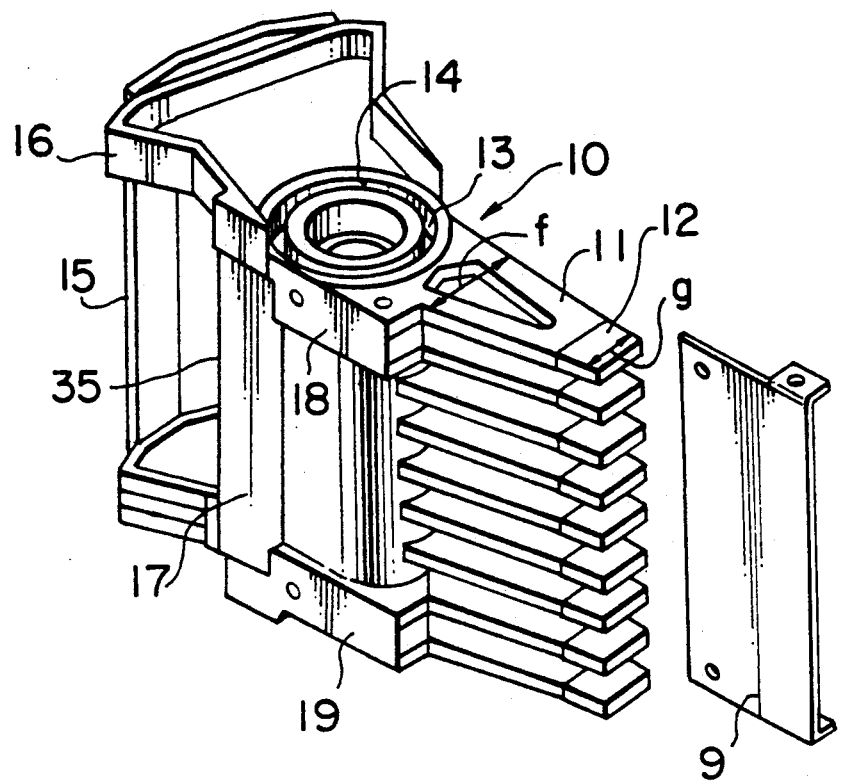
FIG. 3 is a perspective view of the one-piece carriage structure in the first embodiment of the invention.

Referring to FIGS. 2 and 3, the one-piece carriage 10 includes a coil holding portion 16 fixing a coil 15, from which the magnetic force generated acts on a magnet 6' of the actuator 6, a plurality of the guide arms 11 located opposite to the coil holding portion 16 with respect to the carriage axle 7; a cylindrical guide-arm retaining portion 17 in which integrally supports the plural guide arms 11 at their proximal ends which are vertically provided in alignment and at equal intervals. FPC holders 18, 19 are provided at the upper and lower portions of a side face of the guide-arm retaining portion 17 for attachment of a flexible printed circuitboard (FPC board) 9, with bearing retainers 14 being tight-fitted with bearings 20 via outer liners 21 thereof. The bearings 20 are engaged with the carriage axle 7 through their inner liners 23. A concave portion or groove 13 is provided on an outer circular circumference of one of the bearing retainers 14, and support-arm retaining portions 12 are in communication with the support arms. A bearing 20 is provided on each of upper and lower portions of the one-piece carriage 10 and securely fixed in the associated bearing retainer so as to smoothly rotate the one-piece carriage 10. More specifically, a center line 31 of the uppermost guide arm 11 in a direction of thickness thereof (or a center line of the guide arm in the longitudinal direction thereof, as viewed in FIG. 2) is located above a center line 32 of the upper bearing in a direction of height thereof, while a center line 33 of the lowermost guide arm 11 in a direction of thickness thereof is located above the upper surface of the lower bearing 20. At least one groove 13 is provided on the outer periphery of the upper bearing retainer 14. A back portion 35 of the guide-arm retaining portion 27 is positioned opposite to the guide arms 11.

Figure 4:
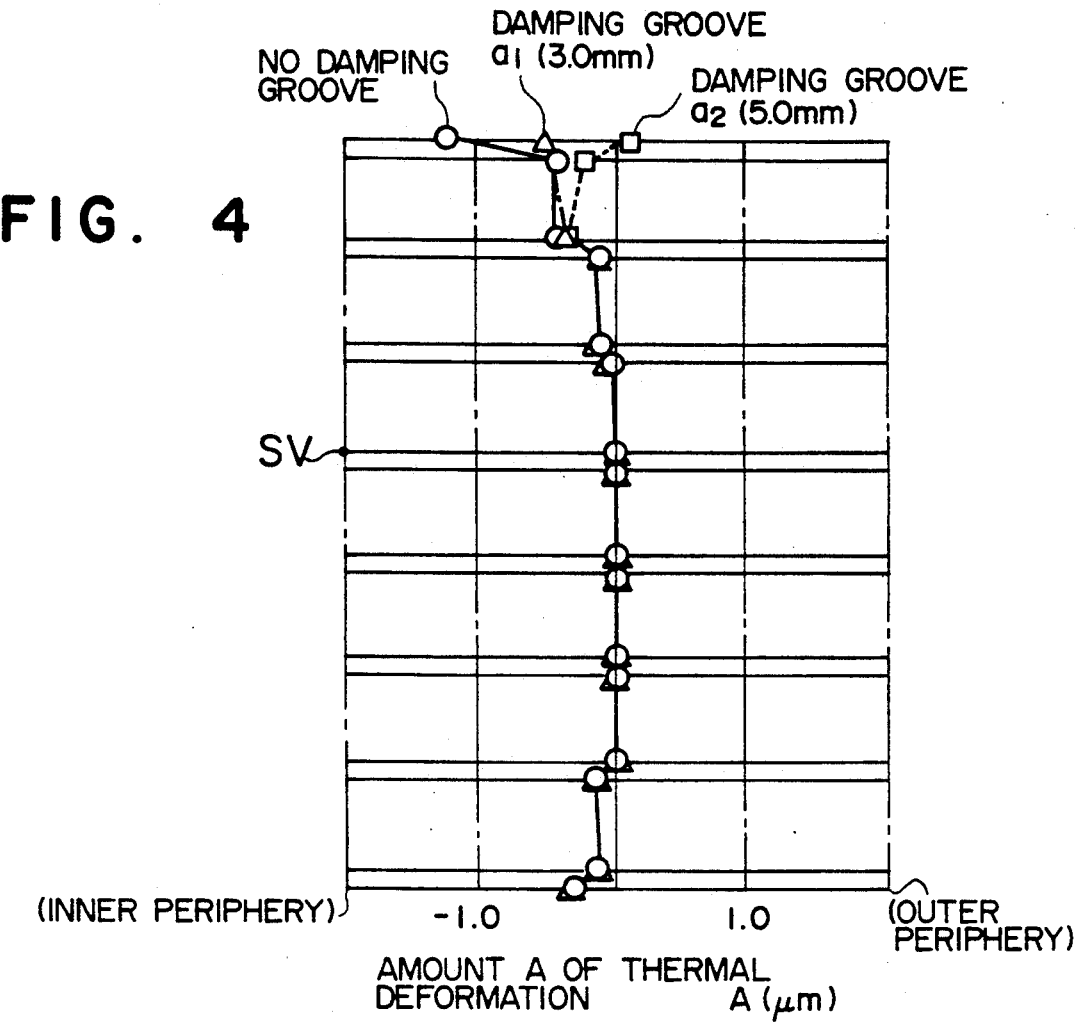
FIG. 4 is a diagram illustrative of a thermal deformation mode of guide arms in dependence upon changes of depth of damping grooves for releasing thermal stress.

In the diagram of FIG. 4, the abscissa indicates an amount A of the thermal deformation, with the left side of the abscissa corresponding to the inner sides of the guide arms and the right side corresponding to the outer sides of the guide arms. The ordinate represents positions of the uppermost to the lowermost guide arms 11. The reference position in the dedicated servo system surface is the seventh position remote from the uppermost position, which is indicated as SV. In the thermal deformation amount A of the uppermost guide arm, the amount A is large when no damping groove is provided, and it is small when the depth of the damping groove is 3.0 to 5.0 mm, as shown in FIG. 4.

Figure 5:
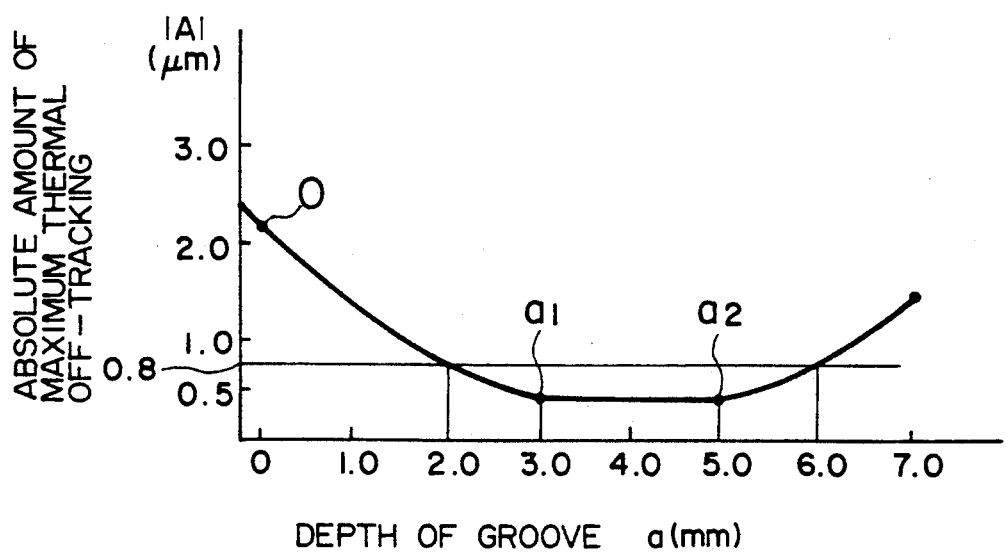
FIG. 5 is a graphical illustration of an absolute amount of the maximum thermal off-tracking in relation to a groove depth.

FIG. 5 illustrates a relationship between a depth of the groove 13 of the bearing retainer 14 previously shown in FIG. 3 and an absolute amount of the maximum thermal off-tracking which acts on the plural guide arms 11 due to a change of temperature, wherein the abscissa indicates the depth a of the groove and the ordinate represents the absolute amount $|A|$ of the maximum thermal off-tracking. The terms of "the amount of the maximum thermal off-tracking" used in the specification means a difference between thermal deformation amounts of the uppermost data guide arm 11 and the servo guide arm 11 (SV) due to a change of temperature. More specifically, a symbol of a indicates a length from the surface of the uppermost guide arm 11 to the center line 32 of the bearing 20 in the direction of height thereof, and $\Delta a$ is a deviation amount of the length a.

In FIG. 5, the absolute amount $|A|$ of the maximum thermal off-tracking presents a curve having three curve sections of a right-falling characteristic in a range from O to $a_1$ where the depth a is 3 mm, a generally-constant characteristic in a range from $a_1$ to $a_2$ where the depth a is 5 mm, and a right-rising characteristic in a range which exceeds the depth $a_2$. As clearly understood from FIG. 5, the amount of the maximum thermal off-tracking in the range from $a_1$ to $a_2$ is minimum, that is, a value of a is 3.0 mm to 5.0 mm.

As for a relationship between a width of a track on a surface of the disk 2 where data is written and a track density (TPI), a data-recording density is 1000 TPI with respect to a track width of 1.3 $\mu$m. However, in recent years, a tendency for a higher density, for example, a track density of 1500 TPI, has been required. In case of the track density of 1500 TPI, the width of the track is 0.8 $\mu$m. With the above-described absolute amount $|A|$ of the maximum off-tracking, the amount $|A|$ in a range of 1.3 $\mu$m is allowable in case of the track density of 1000 TPI and the amount $|A|$ in a range of 0.8 $\mu$m is allowable in case of the track density of 1500 TPI. In this way, an appropriate value a of the depth of the groove is 2.0–6.0 mm when the amount $|A|$ is 0.8 $\mu$m or less. Therefore, the depth of the groove according to the embodiment of the invention is predetermined to be within a range of 2.0–6.0 mm.

Referring again to FIGS. 2 and 3, examples of sizes of the respective component parts in the one-piece carriage 10 will be explained in detail. The length b from the center axis of the carriage shaft to the distal end of each guide arm 11 is 46.0–50.0 mm, the projection length c of the guide arm 11 is 30–45 mm, the diameter d of the inner liner of each bearing 20 is 8 mm, the diameter e of the outer liner of the bearing 20 is 15 mm, the width f of the proximal end of the guide arm 11 is 16–18.5 mm, the width g of the distal end of the guide arm 11 is 8.0–10.0 mm, the width h of the groove 13 is 1.0–2.0 mm, the width i of each bearing retainer is 1.0–2.0 mm, the projection height j of the uppermost guide arm 11 is 0.6–1.0 mm, the thickness k of the proximal end of the guide arm 11 is 1.6–2.2 mm, the thickness l of the distal end of the guide arm 11 is 1.6 mm, the distance m between the adjacent guide arms 11 is 4.5–6.0 mm, a difference in height n between the center line 33 in the direction of thickness of the lowermost guide arm 11 and the upper surface of the lower bearing 20 is 1.0–1.5 mm, and the vertical length p of the bearing 20 is 5.5–6.0 mm.

Additionally, when the width of the bearing 20 is increased, the minimum amount of thermal off-tracking can be obtained by increasing the depth of the groove 13 in proportion to the increasing amount of the width of the bearing 20.

With such construction, upon the occurrence of the temperature change t, a thermal deformation stress deviation $\Delta\delta$ ($=E_0\alpha_0-E_1\alpha_1)\times t$) occurs in a connecting portion between the bearing retainer 14 (coefficient of thermal expansion $\alpha_1$, elastic modulus $E_1$) of the one-piece carriage 10 and the bearing 20 (coefficient of thermal expansion $\alpha_0$, elastic modulus $E_0$). The thermal deformation stress deviation $\Delta\delta$ is transmitted to the bearing retainer 14 so that the circular bearing retainer 14 is deformed by heat. That is to say, when the temperature is raised, contacting surfaces of the outer liner 21 of the bearing 20 and the bearing retainer 14, tight-fitted with each other a normal temperature, are respectively expanded by heat and a distal end portion of the bearing retainer 14 is inclined toward the groove 13 so as to be deformed. Similarly, the plural guide arms 11 are thermally expanded, but they are hardly influenced by the thermal deformation stress deviation $\Delta\delta$ because the groove 13 is provided on the bearing retainer 14 and the center line 31 of the uppermost guide arm 11 in the direction of thickness thereof is positioned above the center line 32 of the bearing 20 in the direction of height thereof. Thus, a difference between the thermal deformation amounts of the uppermost data guide arm 11 and the servo guide arm 11 due to a rise of temperature is decreased. In other words, the thermal off-tracking amount is decreased.

Cast iron (coefficient of thermal expansion $\alpha_0=12.5\times10^{-6}/°C$.) or stainless steel ($\alpha_0=17.3\times10^{-6}/°C$.) are listed as a material for the bearings 20, and there exists as a material for the bearing retainers 14 or the guide arms 11, Al-Si alloy (19±1% Si) ($\alpha_1=17.0-18.0\times10^{-6}/°C$.), Mg-Al alloy (10% Al) ($\alpha_1=25.0-26.5\times10^{-6}/°C$.), Al-Li alloy (7% Li) ($\alpha_1=-20-22\times10^{-6}/°C$.), and there is listed amorphous and thermoplastic polyetherimide resin ($\alpha_1=18-.0-22.0\times10^{-6}/°C$.), which is a plastic materials. These material are combined in such a manner that the coefficient $\alpha_0$ of the bearing is smaller than that of $\alpha_1$ of the bearing retainer.

According to this embodiment, because the deviation of the thermal deformation stress generated between the bearing located at the upper portion of the carriage axis and the bearing retainer of the one-piece carriage which is tight-fitted with the bearing, is reduced due to the provision of the damping groove, the thermal off-tracking amount due to the change of the temperature between the uppermost guide arm and the servo guide arm can be decreased, so that an accuracy of positioning the heads can be effectively enhanced.

Figure 6:
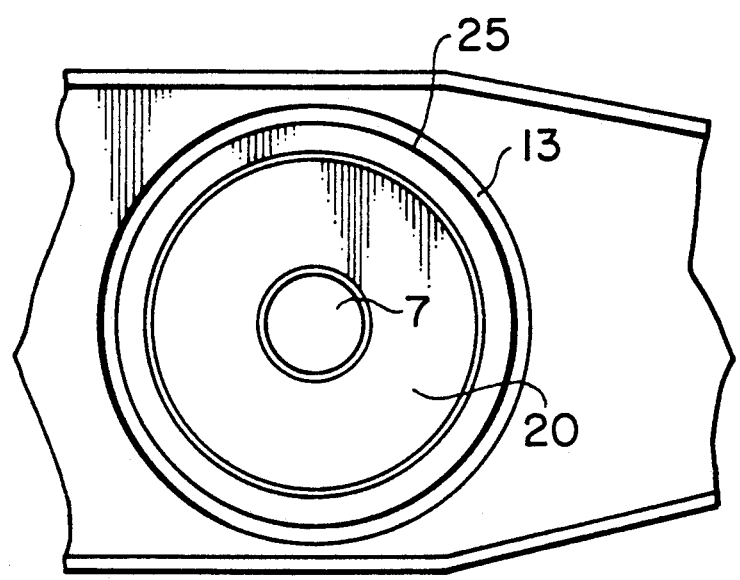
FIGS. 6 and 7 are a plan view and a cross-sectional view showing second and third embodiments of the invention.
Figure 7:
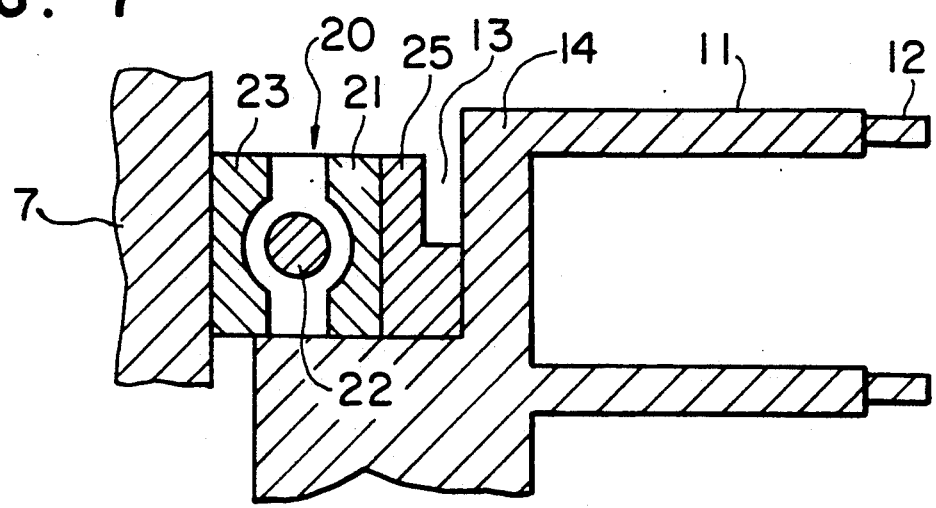

Each of the second and third embodiments of FIGS. 6 and 7 is arranged in such a manner that a stepped buffer ring 25 is mounted between a bearing 20 and a bearing retainer 14 of a one-piece carriage 10 in order to form a groove 13. The coefficient $\alpha_2$ of thermal expansion of the buffer ring 25 is between the thermal expansion coefficient $\alpha_0$ of the bearing 20 and the thermal expansion coefficient $\alpha_1$ of the bearing retainer 14, and the elastic modulus $E_2$ of it is between the elastic modulus $E_0$ of the bearing 20 and the elastic modulus $E_1$ of the bearing retainer 14, and respectively (that is, there are established such relations as $\alpha_0<\alpha_2<\alpha_1$, $E_0>E_2>E_1$).

With the above-described structure of the embodiments of FIGS. 6 and 7, the deviation $\Delta\delta$ produced by the thermal deformation stresses at the contacting portions is decreased. Additionally, a process operation for machining a groove on the bearing retainer is unnecessary.

Alternatively, it is possible to provide a plurality of damping holes (not shown) on the bearing retainer 14 of the one-piece carriage 10. More particularly, a depth a of each damping hole is substantially equal to that of the damping groove 13 of the first embodiment.

In the structure of the damping hole, transmission of the thermal deformation is favorably restricted between the bearing 20 and the bearing retainer 14 so that a similar effect to the above-described embodiments can be also obtained. Since it is unnecessary to form a groove on the entire outer periphery of the bearing retainer by machining and the damping holes have only to be provided at the plural positions, the tedious machining work can be eliminated.

Figure 8:
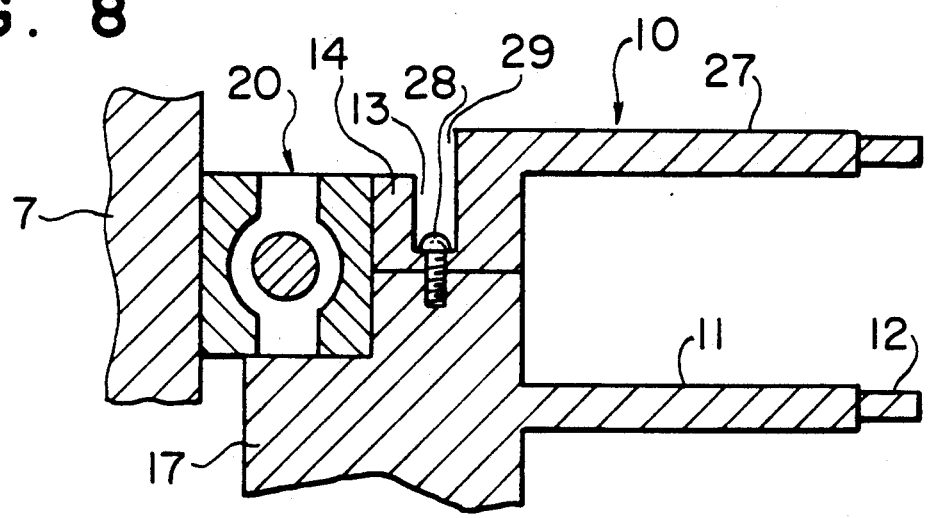
FIGS. 8 and 9 are cross-sectional views showing fourth and fifth embodiments of the invention.

In the fourth embodiment of FIG. 8, an uppermost guide arm 11 is separated from a one-piece carriage 10, with the separated uppermost guide arm 11 being assembled to construct an integral guide arm 27. A groove 13 is provided on an upper bearing retainer 29 of the integral guide arm 27. The integral guide arm 27 is tightly connected to an arm-retaining portion 17 by a tightening member 28 to obtain an assembly of the carriage 10.

According to the embodiment of FIG. 8, one additional component has to be used. The groove at the upper portion of the bearing retainer 29 to be formed by machining is not required so that the embodiment of FIG. 8 provides the bearing retainer having a simple structure which is an advantage similar to the above-mentioned embodiments. Also, since the integral guide arm 27 is formed in a structure having a thin form, it can be easily manufactured of the same material as the one-piece carriage 10. But, the guide arm 27 may be manufactured by a different method from the one-piece carriage 10, for example, the carriage may be manufactured by a die casting method and the guide arm may be manufactured by forging or drawing.

Figure 9:
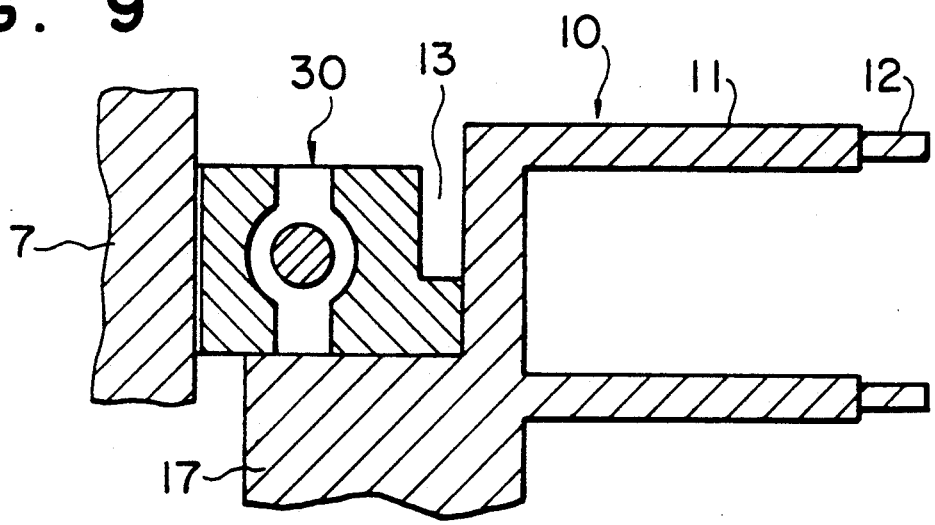

In the embodiment of FIG. 9, a bearing 30 is provided having a stepped outer line to form the groove 13 on the outer periphery of the outer liner 21 of the bearing 20, thereby eliminating a process for forming a groove by machining on the bearing retainer 14 of the one-piece carriage 10 tight-fitted with the bearing 30.

With such construction, since it is unnecessary to machine the groove on the outer periphery of the bearing retainer of the one-piece carriage, the embodiment of FIG. 9 makes it possible to reduce the number of machining processes.

Figure 10:
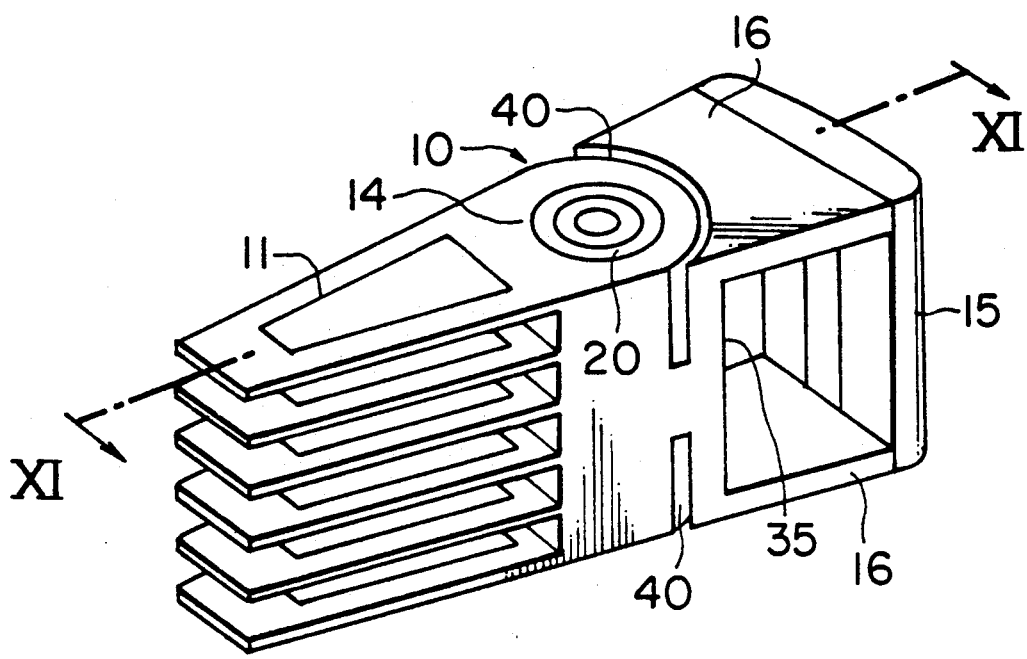
FIG. 10 is a perspective view of a one-piece carriage in a sixth embodiment of the invention.
Figure 11:
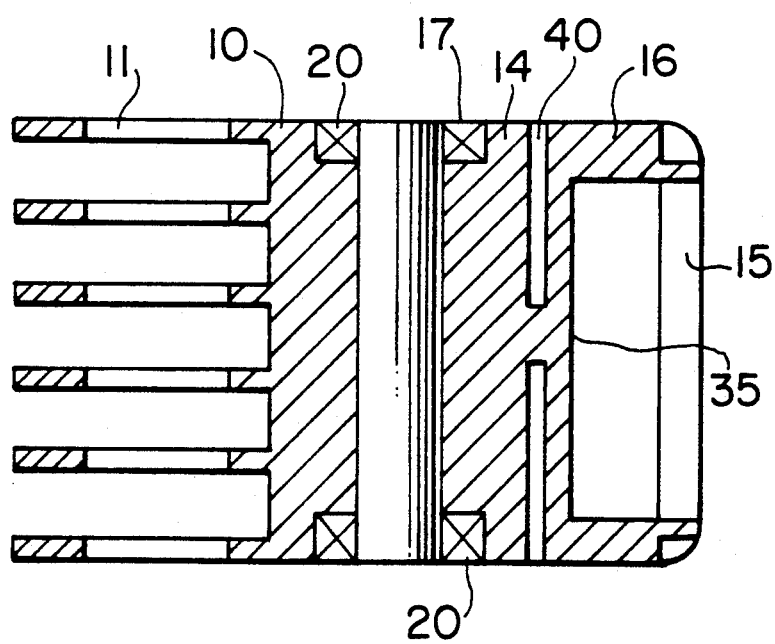
FIG. 11 is a cross-sectional view taken along the line XI—XI in FIG. 10.

In the sixth embodiment of FIGS. 10 and 11, the one-piece carriage 10, a guide-arm retaining portion 17, a bearing retainer 14 for a bearing 20 and a coil holding portion 16 are formed integrally with one another. The bearing 20 is secured to the bearing retainer 14 and a coil of a vertical type 15 is fixed to the coil holding portion 16, respectively. The coil 15 is formed of copper or aluminum wire in a vertical shape, and it is secured to the coil holding portion 16 formed of resin. When an electric current flows through the coil 15, a driving force is generated to rotate the one-piece carriage 10 around the bearing 20. Concurrently, Joule heat is also generated when the electric current flows through the coil 15, with a speed of transmitting that heat varying at the respective parts of the one-piece carriage 10 so that heat distribution in the carriage is not uniform. Further, since the material of the coil holding portion 16 has a thermal expansion coefficient different from that of the coil 15, an uneven thermal stress distribution (thermal distortion) is caused in the carriage 10.

In order not to transmit the thermal distortion to the distal end of each guide arm 11, it is effective to provide concave portions or grooves 40 respectively extending inwardly from the upper and the lower surfaces of the one-piece carriage 10. The one-piece carriage 10 and the coil holding portion 16 are connected to each other at their vertically central portions. In view of symmetric property of the heat distortions transmitted from the upper and the lower surface of the one-piece carriage 10, the heat distortions are canceled at the central portion of the one-piece carriage 10, thereby restricting transmission of the thermal distortion to the guide-arm retaining portion 17.

In the embodiment of FIGS. 10 and 11, the vertically symmetrical concave portions 40 are provided between the bearing retainer 14 and the coil holding portion 16 of the one-piece carriage 10. The concave portions 40 absorb the thermal distortions generated at the upper and lower portions of the coil holding portion 16 of the one-piece carriage 10. The coil holding portion 16 is connected to the bearing retainer 14 at its one central portion so that the thermal stress distortion is not transmitted to the guide-arm retaining portion 17.

Unless the concave portions 40 are provided in the one-piece carriage 10, the thermal stress distortion generated in the coil holding portion 16 is transmitted to the vicinity of the bearing retainer 14 and the guide arms 11 so that the upper and lower portions and the center portion of the guide-arm retaining portion 17 are deformed unevenly.

Figure 12:
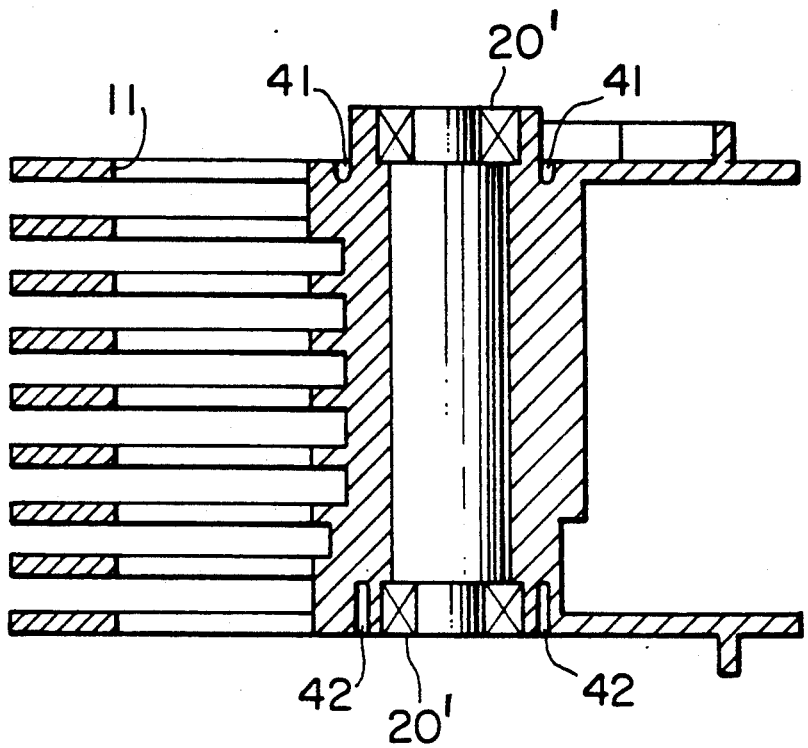
FIG. 12 is a cross-sectional view of a one-piece carriage in a seventh embodiment of the invention.
Figure 13:
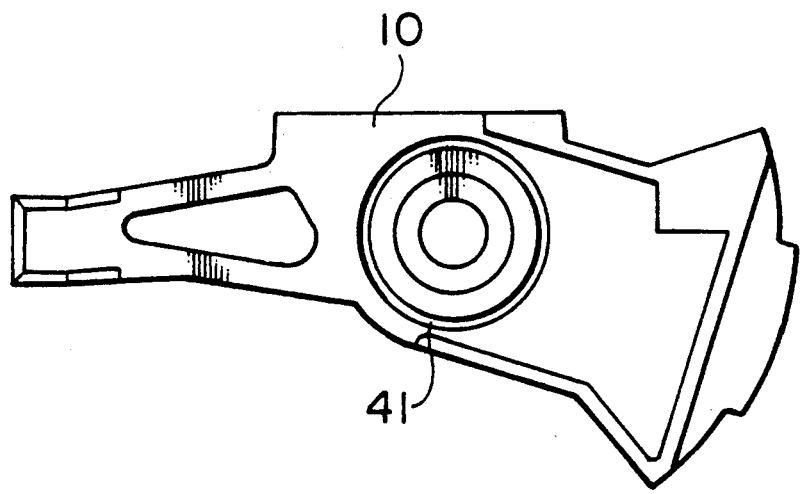
FIG. 13 is a plan view of the one-piece carriage of FIG. 12.

In the seventh embodiment of FIGS. 12 and 13, there are provided, in the vicinity of a bearing 20' grooves 41, 42 for eliminating an influence of heat generated in the bearing 20'. More particularly, the grooves 41, 42 are provided for preventing the friction heat generated in the bearing 20' from being transmitted to the entire one-piece carriage 10 when the one-piece carriage 10 swingingly moves. In the embodiment of FIGS. 12 and 13, the periphery of the upper bearing 20' is in a convex configuration extending upwardly. This is a result of the guide arms 11 being molded by die casting. By forming the periphery of the bearing 20' into the similar convex configuration, it is possible to restrain the friction heat generated in the bearing 20' from being transmitted to the guide arms 11.

An eighth embodiment of the invention will be described hereinafter, by way of example of an one-piece carriage made of an Al-Si alloy by die casting. Incidentally, the Al-Si alloy is an Al alloy which contains 19 wt % of Si and extremely small quantities of Ni, Fe, Cu and Mg. Though the content of Al is changed to some extent depending on amounts of addition of Ni, Fe, Cu and Mg, but it is generally 70–76 wt %.

Figure 14:
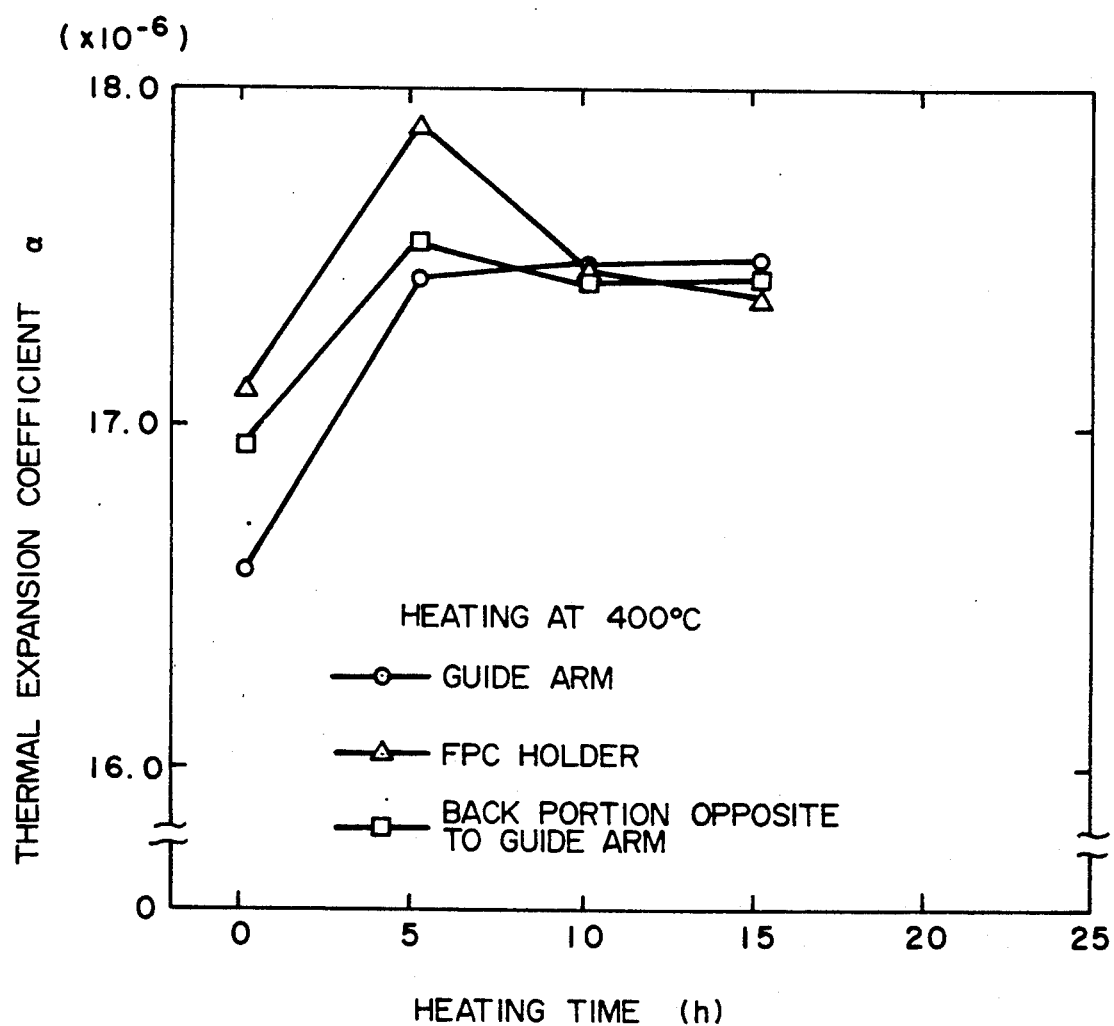
FIGS. 14 and 19 are graphical illustrations each showing changes of thermal expansion coefficients when samples extracted from a guide arm, FPC holders and a guide-arm back portion of the one-piece carriage are heated.

FIG. 14 indicates as result obtained by measuring changes of thermal expansion coefficients of samples (about 2×3 mm, length of about 12 mm) extracted from the guide arm 11 (sample A), the FPC holders 18 (sample B) and the back portion 35 of the arm-retaining portion opposite to the guide arms (sample C) of the one-piece carriage 10 when they are heated at 400° C. A heating time of zero (0) indicates a condition that the samples are heat-treated at about 200° C. for two hours or more, in order to remove distortion caused by die casting after they are processed by the die casting. The samples were heated in an electric furnace in the atmosphere. The temperature in the furnace is distributed within a range of ±10° C., and therefore they are practically heated at 400°±10° C. However, such deviation in the temperature has no influence on the effect of the invention.

As shown in FIG. 14, the thermal expansion coefficients of the respective samples are substantially equal to one another when the heating time exceeds ten hours. The differential maximum value of the thermal expansion coefficients of the samples is $0.2 \times 10^{-6}$. Under such conditions, since the thermal expansion coefficients of the respective component parts are generally in equilibrium, the thermal deformation of the one-piece carriage 10, due to heat generation during operation of the apparatus is remarkably reduced. As a result, an off-tracking amount (an amount of an error in positioning a head from the normal magnetic recording position on a magnetic disk 2) of the head 4 resulting from the thermal deformation of the one-piece carriage 10 is decreased from about 1 μm to 0.2 μm so that an accuracy in positioning the head is greatly enhanced and moreover, a reliability of the magnetic disk unit 1 can be substantially increased.

Because the thermal off-tracking amount is influenced by a processing or assembly accuracy of the one-piece carriage 10, a reduction amount of the thermal off-tracking changes depending upon circumstances.

Figure 15:
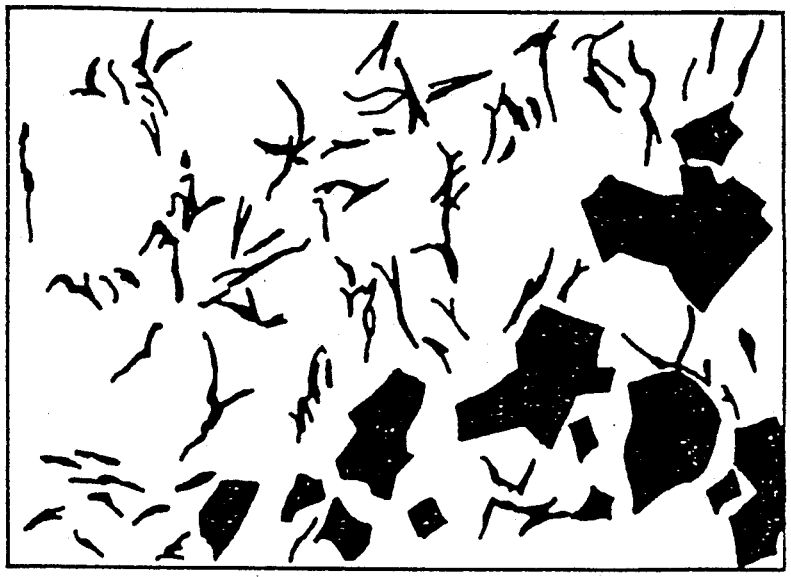
FIGS. 15 and 16 are schematic diagrams illustrative of changes of eutectic-crystal Si particles which are divided into finer particles by heating.
Figure 16:

In order to clearly explain a process in which eutectic crystal Si particles are finely divided by heating, FIGS. 15 and 16 typically illustrate observation results of the structure of the one-piece carriage by means of SEM. In addition, FIGS. 17 and 18 are microphotographs of metallic structures which are respectively bases for FIGS. 15 and 16.

Figure 17:
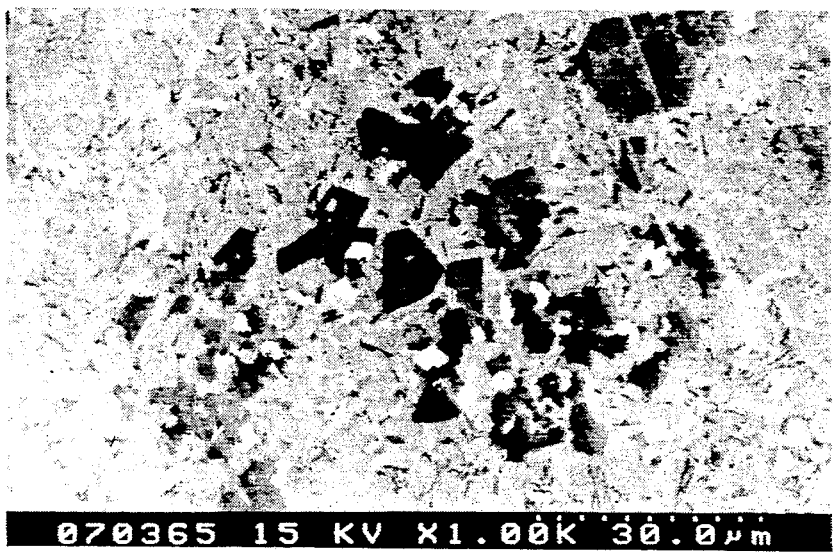
FIGS. 17 and 18 are microscopic photographs of metal compositions, showing states of divided eutectic-crystal Si particles.

FIGS. 15 and 17 show the structures in the state of being processed by die casting. Each structure comprises large-sized primary crystal Si particles deposited from the base of Al and small eutectic crystal Si particles deposited together with Al after the primary crystal Si particles are deposited. The large particles in angular shapes are the primary crystal Si particles and the elongated particles are the eutectic crystal Si particles.

Figure 18:
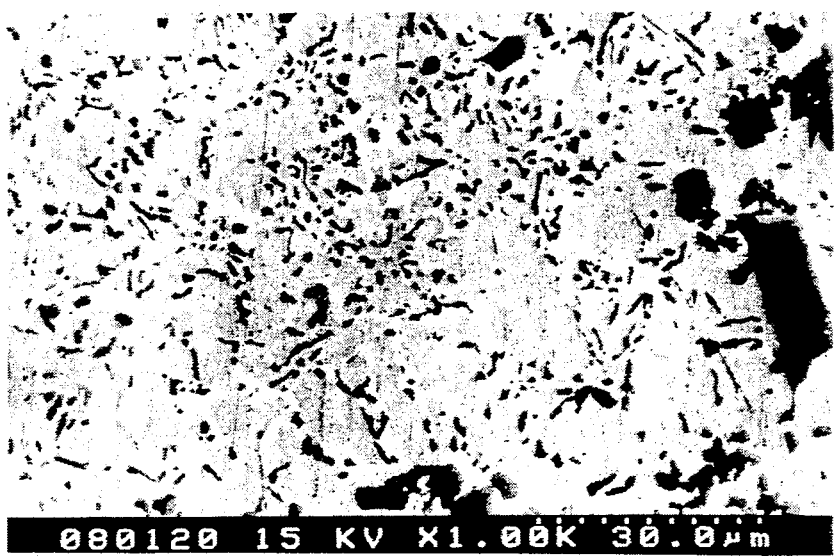

When the above-described structure is heated, the elongated eutectic crystal Si particles are divided and become spherical-shaped particles, as shown in FIGS. 16 and 18.

Figure 19:
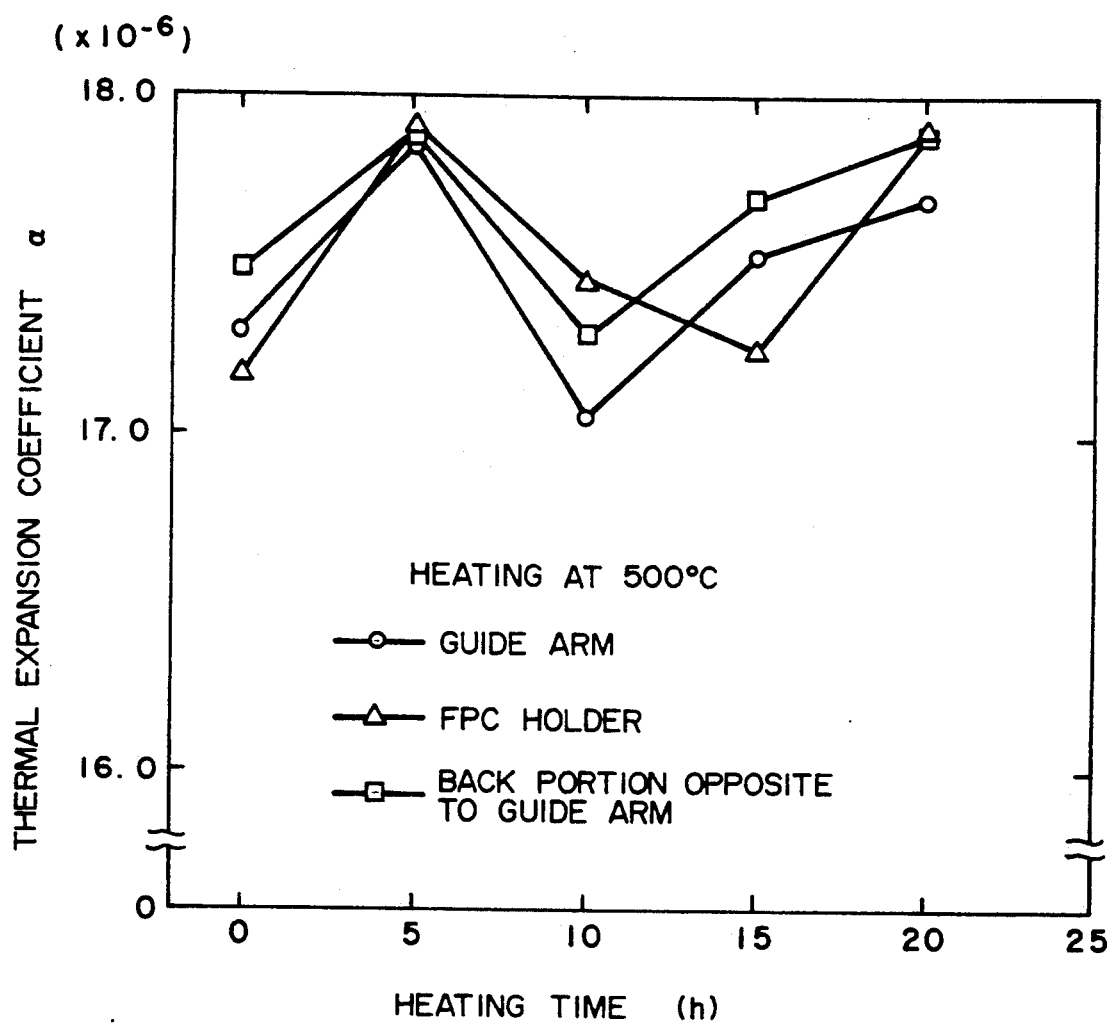

FIG. 19 shows a result obtained by measuring changes of the thermal expansion coefficients of the samples (width×thickness=about 2×3 mm, length of about 12 mm) extracted from the guide arm 11 (sample A), the FPC holders 18 (sample B) and the back portion 35 of the arm-retaining portion opposite to the guide arms (sample C) of the one-piece carriage 10 when they are heated at 500° C. A heating time of 0 in FIG. 19 has the same meaning as in FIG. 14. The samples were heated in the electric furnace in the atmosphere, similarly to FIG. 14.

In this experiment, the temperature in the furnace is distributed within a range of about ±10° C., and therefore the heating temperature is actually 500°±10° C. However, such deflection of the temperature has no influence on the effect of the invention.

As shown in FIG. 19, the thermal expansion coefficients of the respective samples are substantially equal to one another when they are heated for five hours. The maximum differential value of the thermal expansion coefficients of the samples is $0.03 \times 10^{-6}$. Accordingly, the thermal deformation of the one-piece carriage 10 is decreased so that the off-tracking amount of the head 4 is considerably reduced. Further, an accuracy of positioning the head is enhanced and a reliability of the magnetic disk unit 1 is remarkably increased.

However, in the case where the samples are heated for not less than five hours, the thermal expansion coefficients thereof become unequal to one another again. When the structures of the respective samples after heated for not less than five hours are observed, remarkable changes of the Si-structures resulting from the heating time is not cognizable. Therefore, this phenomenon that the thermal expansion coefficients of the samples become unequal is not caused by the changes of the structures of the Si-phases but by something else.

When the samples heated for five hours or more are analyzed, it is understood that the thermal expansion coefficients of the respective samples are increased because minutely-divided Si particles are penetrated into base materials of Al so that Al lattices are distorted. The penetrating amounts of the Si particles in the above samples are different from one another, which results in an occurrence of dispersion of the thermal expansion coefficients of the samples. Moreover, when deposits of the respective samples are analyzed, it is recognized that there is a difference between deposit amounts of minutely fine deposits, for example, $Al_7Cu_2Fe$, $Al_2Mg_3$ or the like in this embodiment so that the dispersion of the thermal expansion coefficients occurs.

Succeedingly, if the materials for the carriage are heated at not less than 500° C., the heating time of five hours is preferable. A heating time more than five hours or a heating temperature exceeding 500° C. is not effective in equalizing the thermal expansion coefficients, but it may increase the thermal off-tracking amount of the heads 4 to the contrary. If the heating temperature is not more than 400° C., a time required for changing the structure of the Si phase to equalize the thermal expansion coefficients, is considerably increased. More particularly, about thirty hours is required for the heating time in case of the heating temperature of 300° C. In view of manufacturing cost of the carriage, the heating temperature of not more than 300° C. is not practical.

Figure 20:
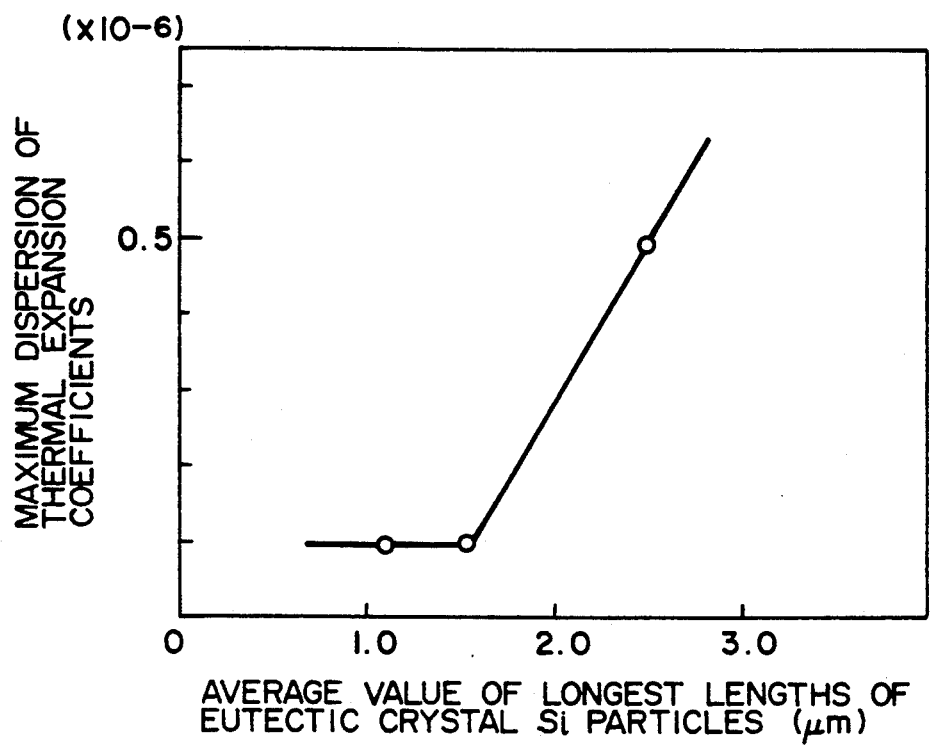
FIG. 20 is a graphical illustration of a relationship between an average value of the longest lengths of eutectic-crystal Si particles and a maximum dispersion of thermal expansion coefficients.
Figure 21:
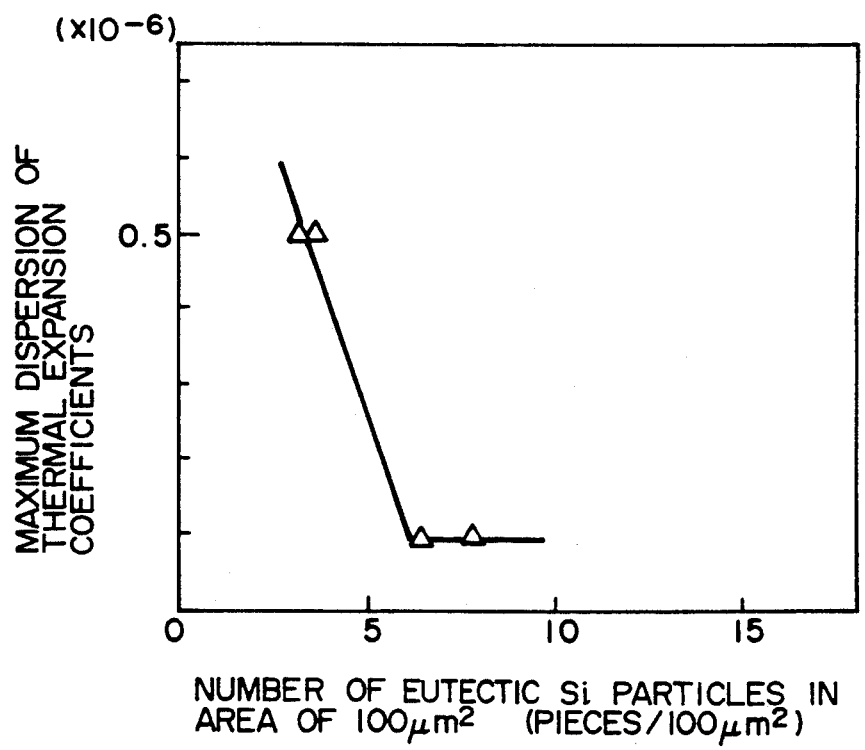
FIG. 21 is a graphical illustration of a relationship between the number of eutectic-crystal Si particles in a cross-sectional structure existing in an area of 100 $\mu m^2$ and a maximum dispersion of thermal expansion coefficients.

FIGS. 20 and 21 indicate a relationship between the structure of the respective samples heated at 400° C. and the maximum value of a difference of the thermal expansion coefficients between the respective samples (the maximum dispersion).

FIG. 20 shows a relationship between the average value of the longest lengths of the eutectic crystal Si particles and the maximum dispersion of the thermal expansion coefficients. When the average value of the longest lengths of the particles is not more than 1.6 μm, the maximum dispersion of the thermal expansion coefficients of the component parts is reduced to a large extent.

FIG. 21 is illustrative of a relationship between the number of the eutectic Si particles in the cross-sectional structure existing in an area of 100 μm² and the maximum dispersion of the thermal expansion coefficients. If the number of the eutectic crystal Si particles is about five or more, the maximum dispersion of the thermal expansion coefficients of the component parts is remarkably decreased.

Accordingly, as the structure for equalizing the thermal expansion coefficients of the component parts, it is appropriate that the average value of the longest lengths of the eutectic crystal Si particles is not more than 1.6 μm, or that the number of the eutectic crystal Si particles in the cross-sectional structure in the area of 100 μm² is five or more.

In the above-described embodiment, the effect of the invention has been explained on the basis of the one-piece carriage made of the Al alloy containing 19 wt % of Si. However, since the thermal deformation is a problem inherent with the Al alloy in which the eutectic crystal Si phase exists, the invention is effective with a Al-Si alloy wherein the eutectic crystal Si phase exists, irrespective of a content rate of Si.

Though the one-piece carriage made by die casting having excellent productivity has been described so far, the invention is effective in a carriage of which structure, i.e., thermal expansion coefficient is changed in accordance with a difference of cooling speed after forging, with the carriage not being a die-case product.

According to the invention, because the center line of the uppermost guide arm in the direction of thickness thereof is located higher than the center line of the upper bearing in the direction of height thereof, and the damping groove is provided on the bearing retainer of the one-piece carriage for holding a bearing to engage with the rotary shaft, thereby reducing the thermal deformation stress generated at the contacting portions between the bearing retainer and the guide arm, the thermal deformation is prevented from being transmitted to a plurality of guide arms unbalancedly, thereby improving an accuracy of positioning the heads and enhancing a reliability of the magnetic disk unit effectively.

Further, in accordance with the invention, a groove or cut-off portion is provided on a portion where thermal distortion is liable to occur, with the groove being capable of preventing thermal off-tracking caused by the thermal distortion.

Moreover, according to the invention, the dispersion of the thermal expansion coefficients resulting from the unevenness of the structure of the one-piece carriage made by die casting is resolved, thus obtaining a carriage having a low thermal deformation tendency. By utilizing the one-piece carriage of the invention, the reliability of the magnetic disk unit is largely increased so that the magnetic disk unit can cope with an apparatus of higher density.

What is claimed is:

1. A magnetic disk unit comprising a carriage structure including a rotary shaft, a plurality of guide arms which are supported in one body on a guide-arm retaining portion at their proximal ends and which extend independently with respect to one another in a parallel relationship in an axial direction of said guide-arm retaining portion; bearing retainers formed on both ends of said guide-arm retaining portion; and bearings fixed on said bearing retainers so as to rotatably connect said guide-arm retaining portion around said rotary shaft, wherein said carriage structure is arranged in such a manner that at least one of the outermost guide arms has a center line in a direction of thickness thereof, the center line being located outside of a center line of the bearing in a direction of height thereof, the bearing being provided on the side corresponding to said at least one of the outermost guide arms, and said carriage structure includes a concave portion which is continuously formed on the outer peripheral portion of said bearing retainer, extending inwardly from the outside surface of the bearing retainer.

2. A magnetic disk unit according to claim 1, wherein said at least one of the outermost guide arms and said concave portion of the bearing retainer are formed separately from the other guide arms and the remainder of said guide-arm retaining portion, and both of the former and the latter are integrally fixed to each other by a tightening member.

3. A magnetic disk unit comprising a carriage structure including a rotary shaft; a plurality of guide arms which are integrally supported on a guide-arm retaining portion at their proximal ends and which extend independently from one another in a parallel relationship in an axial direction of said guide-arm retaining portion; bearing retainers formed on both ends of said guide-arm retaining portions; and bearings fixed on said bearing retainers so as to rotatably connect said guide-arm retaining portion around said rotary shaft, wherein said carriage structure is arranged in such a manner that at least one of the outermost guide arms has a center line in a direction of thickness thereof, the center line being located outside of a center line of the bearing in a direction of height thereof, the bearing being provided on the side corresponding to said at least one of the outermost guide arms, and said carriage structure includes buffering means made of a material different from said bearing and said bearing retainer therebetween, said buffering means being provided with a continuous concave portion extending from an outer surface thereof toward an inside surface thereof.

4. A magnetic disk unit comprising a carriage structure including a rotary shaft; a plurality of guide arms which are integrally supported on a guide-arm retaining portion at their proximal ends and which extend independently with respect to one another in a parallel relationship in an axial direction of said guide-arm retaining portion; bearing retainers formed on both ends of said guide-arm retaining portions; and bearings fixed on said bearing retainers so as to rotatably connect said guide-arm retaining portion around said rotary shaft, wherein said carriage structure is arranged in such a manner that at least one of the outermost guide arms has a center line in a direction of thickness thereof, the center line being located outside of a center line of the bearing in a direction of height thereof, the bearing being provided on the side corresponding to said at least one of the outermost guide arms, and the carriage structure includes a notched portion which is formed on an outer corner of a contacting portion of the bearing with the bearing retainer so as to define a concave portion.

5. A magnetic disk unit according to one of claims 1 to 4, wherein the lowermost guide arm includes a center line in a direction of thickness thereof located higher than a center line of the lower bearing in a direction of height thereof.

6. A magnetic disk unit according to one of claims 1, 2 or 4, wherein a coefficient $\alpha_0$ of thermal expansion of the material for the bearings of said carriage structure is less than a coefficient $\alpha_1$ of thermal expansion of the material for the bearing retainers.

7. A magnetic disk unit according to claim 5, wherein the thermal expansion coefficient $\alpha_0$ of the material for the bearings is less than the thermal expansion coefficient $\alpha_1$ of the material for the bearing retainers.

8. A magnetic disk unit according to claim 3, wherein, when the thermal expansion coefficients of the materials for the bearings, the bearing retainers and the buffering means of said carriage structure are represented by $\alpha_0$, $\alpha_1$, $\alpha_2$ and the elastic modulus thereof are represented by $E_0$, $E_1$, $E_2$, the thermal expansion coefficients and the elastic modulus satisfy the following relationships:

$$\alpha_0 < \alpha_2 < \alpha_1 \text{ and } E_0 > E_2 > E_1.$$

9. A magnetic disk unit according to claim 3, wherein said bearings, said bearing retainers and said buffering means of said carriage structure are integrally tight-fitted with one another.

10. A magnetic disk unit according to one of claims 1 to 4, wherein said carriage structure is formed in such a manner that a depth of said concave portion substantially corresponds to the center line of the bearing in the direction of height thereof.

11. A magnetic disk unit according to one of claims 1 to 4, wherein said concave portion is formed so as to extend inwardly on the outer surface of said at least on of the outermost guide arms by a depth of 2.0–6.0 mm.

12. A magnetic disk unit comprising a carriage structure including a one-piece carriage rotatably supported by a rotary shaft, at least one load spring attached to said one-piece carriage at its one end, a magnetic head secured to the other end of said load spring for recording/reproducing data in or from a magnetic disk, and a coil fixed to said one-piece carriage and constituting drive means for driving said one-piece carriage, and a concave portion disposed in a vicinity and by a side of a coil fixing portion in said carriage structure.

13. A magnetic disk unit according to claim 12, wherein bearing retainers are formed on said carriage, and wherein the coil fixing portion is formed in one piece with the bearing retainers.

14. A magnetic disk unit according to one of claims 12 or 13, wherein said fixing portion has a coil of a vertical type.

15. A magnetic disk unit according to claim 12, wherein said carriage structure is formed in such a manner that a depth of said concave portion substantially corresponds to a center line of a bearing rotatably connecting said one-piece carriage to the rotary shaft in a direction of a height thereof.

16. A magnetic disk unit according to one of claims 1 to 4, wherein thermal expansion coefficients of said plurality of guide arms and said arm retaining portion of said carriage structure are substantially equal to each other.

17. A magnetic disk unit according to one of claims 1 to 4, wherein thermal expansion coefficients of said plurality of guide arms, a portion of said guide arm retaining portion opposite to said at least one of the outermost guide arms, and flexible printed circuit board holders for attaching a printed circuit board to the guide-arm retaining portion, are at least substantially equal to one another.

18. A magnetic disk unit according to one of claims 1 to 4, wherein an entire main body of said carriage structure is made of an alloy whose main components are Al and Si, and eutectic crystal Si particles in a microscopical structure of said plurality of guide arms and/or guide-arm retaining portion are finely divided.

19. A magnetic disk unit according to claim 18, wherein an average value of the longest eutectic crystal Si particles in the microscopical structure of said plurality of guide arms, said guide-arm retaining portion and/or said bearing retainers is 1.6 $\mu$m or less.

20. A magnetic disk unit according to claim 18, wherein a number of eutectic crystal Si particles in the microscopical structure of said plurality of guide arms, said guide-arm retaining portion and/or bearing retainers is not less than 5.0 per 100 $\mu$m$^2$.

* * * * *